United States Patent [19]

Reitze

[11] Patent Number: 4,718,803
[45] Date of Patent: Jan. 12, 1988

[54] FRANGIBLE STAPLE

[76] Inventor: Frederick T. Reitze, 5532 South Kenwood Ave, Apt. 301, Chicago, Ill. 60637

[21] Appl. No.: 794,270

[22] Filed: Nov. 1, 1985

Related U.S. Application Data

[63] Continuation of Ser. No. 604,441, Apr. 27, 1984, abandoned, which is a continuation of Ser. No. 83,862, Oct. 11, 1979, abandoned.

[51] Int. Cl.⁴ ............................................. F16B 15/00
[52] U.S. Cl. ................................. 411/476; 411/457; 227/155
[58] Field of Search ..................... 411/442–444, 411/447, 457, 461–465, 476, 475, 483; 59/71–77; 227/155

[56] References Cited

U.S. PATENT DOCUMENTS

| Re. 23,566 | 10/1952 | Henriksen | 85/49 |
|---|---|---|---|
| 330,444 | 11/1885 | Van Reyper | 85/49 X |
| 1,321,623 | 11/1919 | Griswold | 85/49 X |
| 1,876,322 | 9/1932 | Rudolph | 85/49 X |
| 1,885,599 | 11/1932 | Hile | 227/155 |
| 2,111,404 | 3/1938 | Pankonin | 411/457 |
| 2,202,905 | 6/1940 | Goodstein | 85/49 |
| 2,277,931 | 3/1942 | Moe | 85/49 |
| 2,351,045 | 6/1944 | Heller | 85/49 |
| 2,390,219 | 12/1945 | LaPlace | 85/49 |
| 2,564,900 | 8/1951 | Henriksen | 85/49 |
| 3,368,445 | 2/1968 | Trzesniewski | 85/49 |

FOREIGN PATENT DOCUMENTS

| 931044 | 8/1955 | Fed. Rep. of Germany | 411/476 |
|---|---|---|---|
| 932183 | 8/1955 | Fed. Rep. of Germany | 85/49 |
| 1094230 | 12/1960 | Fed. Rep. of Germany | 85/49 |
| 2261483 | 6/1973 | Fed. Rep. of Germany | 85/49 |
| 1065951 | 1/1954 | France | 85/49 |
| 328332 | 4/1958 | Switzerland | 85/49 |
| 737897 | 10/1955 | United Kingdom | 85/49 |

Primary Examiner—Neill Wilson

[57] ABSTRACT

The staple has a non-linear bright and two spaced-apart legs depending therefrom. Material weakening means, such as a pair of nicks, is in the regions of the bight adjacent to the legs. When the staple is applied, the legs are bent into a plane approximately parallel to the plane of the bight. When it is desired to remove the staple, the bight is gripped and rotated until it breaks away from the legs.

3 Claims, 11 Drawing Figures

FRANGIBLE STAPLE

This application is a continuation of application Ser. No. 604,441, filed Apr. 27, 1984, now abandoned, which is a continuation of application Ser. No. 83,862, filed Oct. 11, 1979, now abandoned.

BACKGROUND OF THE INVENTION

Staples are commonly used as a semi-permanent means to interconnect two or more pieces of paper. When it is necessary to remove the staple, a tool is used which automatically draws the bight part of the staple away from the paper and thereby withdraws the legs.

SUMMARY OF THE INVENTION

It is an important object of the present invention to provide a staple which is readily removable without the use of tools.

In summary, there is provided a frangible staple for fastening together a plurality of sheets or the like, comprising a non-linear bight, two spaced-apart legs depending therefrom, and a pair of material-weakening means respectively in the bight in the regions thereof adjacent to the legs.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the invention.

BRIEF DESCRIPTION OF THE DRAWINGS

For the purpose of facilitating an understanding of the invention, there is illustrated in the accompanying drawings, preferred embodiments thereof, from an inspection of which, when considered in connection with the following description, the invention, its construction, and operation, and many of its advantages should be readily understood and appreciated.

DESCRIPTION OF THE PREFERRED EMBODIMENTS

Figure 1:
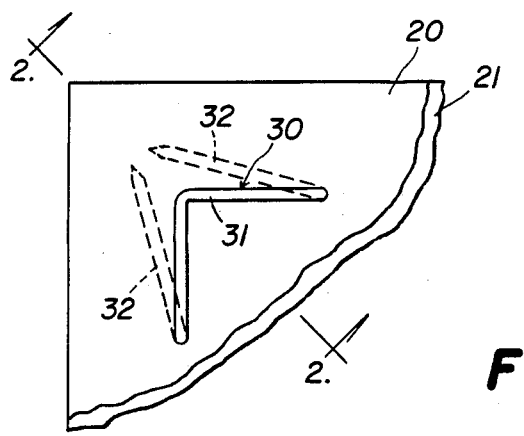
FIG. 1 is a fragmentary view of two sheets of paper held together by a frangible staple incorporating the features of the present invention.
Figure 2:
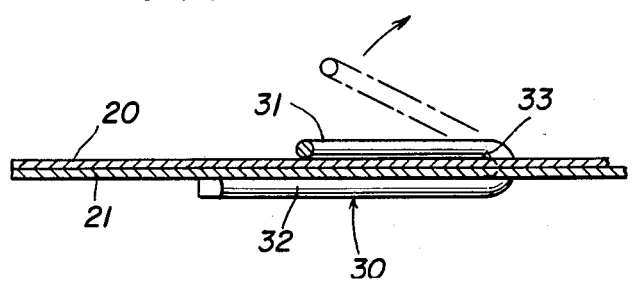
FIG. 2 is a sectional view along the line 2—2 of FIG. 1, on a slightly enlarged scale, showing how the staple is removed.
Figure 3:
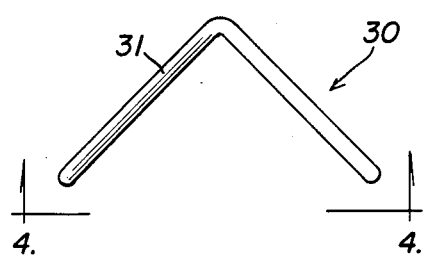
FIG. 3 is a plan view of the staple prior to application to the papers.
Figure 5:
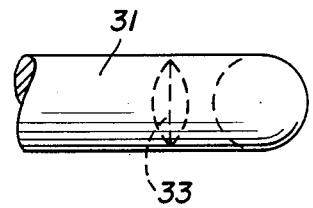
FIG. 5 is an enlarged fragmentary view of one end of the bight showing a nick therein.
Figure 4:
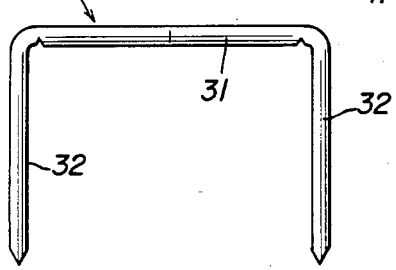
FIG. 4 is an end elevational view along the line 4—4 of FIG. 3.
Figure 6:
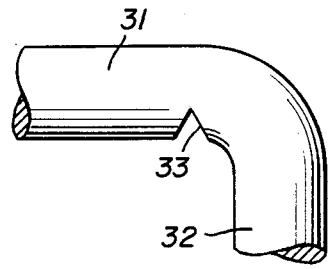
FIG. 6 is a fragmentary elevational view of the end depicted in FIG. 5.

Referring now to FIGS. 1 through 6, there is depicted two sheets of paper 20 and 21 held together by a staple 30 incorporating the features of the present invention. The staple 30 comprises a shallow V-shaped bight 31 and a pair of legs 32. The bight 31 lies in a plane substantially parallel to the planes of the sheets 20 and 21. The plane of the legs 32, in the position shown in FIGS. 1 and 2, is also substantially parallel to the planes of the sheets 20 and 21. The staple 30 further comprises a pair of material weakening means preferably consisting of a pair of notches or nicks 33 in the bight 31 in the regions thereof adjacent to the legs 32.

When it is desired to remove the staple 30, one slips his fingernail under the pointed part of the bight 31, which he grasps. He then rotates the bight 31 in the direction of the arrow in FIG. 2, causing the bight 31 to break away from the legs 32 at the nicks 33. The legs 32 will readily fall out, so that the staple has been removed without the use of a tool.

In the preferred embodiment, the legs 32 are sufficiently long so that their ends nearly touch when applied to the papers 20 and 21, as shown in FIG. 1. The greater the number of papers held together, the shorter the legs 32 in a plane parallel to the papers. With the staple 30 applied to just a few pieces of paper, such as shown in FIG. 1, it would be necessary to hold the corners of the papers and also the ends of the legs 32 with the index finger and the thumb of the left hand, so that the legs do not pull through and tear the papers when the bight 31 is bent upwardly with the right hand. When there are more papers stapled, the legs 32 will not extend as far, and they may be gripped by the left hand, but the greater strength afforded by the larger number of papers will keep the legs from tearing through the papers when the bight 31 is bent upwardly. When the pile of papers is thicker still, removal will be successful even though only the corners of the papers are held in the left hand.

FIGS. 3 to 6 depict the staple in its undeformed condition, that is, prior to being applied to the sheets 20 and 21. In such condition, the legs 32 are parallel and lie in a plane perpendicular to the plane of the bight 31.

While the staple 30 is shown to have a V-shape, it is to be understood that any non-linear shape providing a grasping portion would be satisfactory. For example, the bight could be U-shaped or the V could be clipped off.

Figure 7:
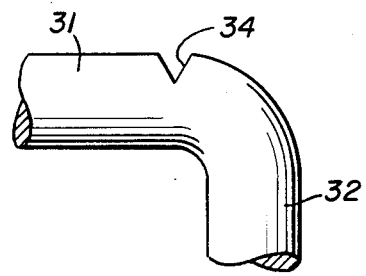
FIG. 7 is a view like FIG. 6, depicting an alternative embodiment.
Figure 8:
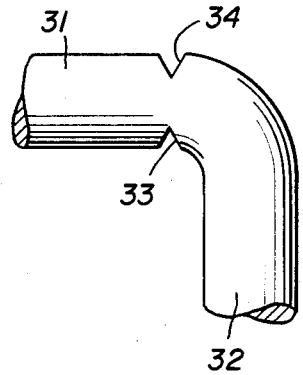
FIG. 8 is a view like FIG. 6, depicting yet a third alternative embodiment.

FIG. 7 depicts an alternative form, wherein the nicks 34 are located on the top of the bight 31, that is, the surface away from the legs 32. In FIG. 8, a nick 34 is provided on each end of the top side of the bight 31, that is, the surface away from the legs 32; and a nick 33 is provided on each end of the underside of the bight 31.

The staple 30 may be made from a long piece of wire fed to a forming machine in which short pieces of appropriate length are cut off and formed into individual staples. The wire may have any suitable cross section; it may be round, square or rectangular. In the embodiments shown, the staple 30 has a round cross section. The end of each of the legs 32 may be chisel shaped as shown.

Figure 10:
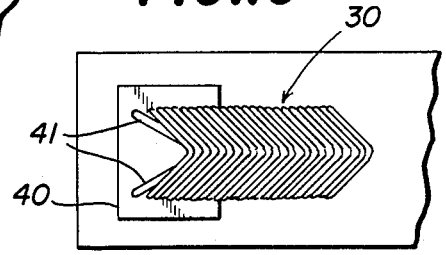
FIG. 10 depicts a gang of staples as it would be mounted in a stapling machine.

For use in stapling machines, staples are usually secured together in multiple form, as in the gang illustrated in FIG. 10. Such a gang is formed by placing a plurality of staples 30 side by side, in parallel relation, and then securing them to each other by adhesive.

Figure 9:
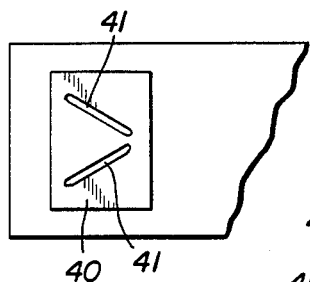
FIG. 9 depicts an anvil used to form the staple legs into the position shown in FIG. 1.

FIG. 9 depicts an anvil 40 of a stapling machine having grooves 41 that converge. As is common practice, the sheets 20 and 21 to be held together are placed between the anvil 40 and the stapling machine carriage that carries the gang of staples depicted in FIG. 10. A hammer drives the forwardmost staple 30 downwardly through the sheets until it strikes the grooves 41 in the anvil 40. The legs 32 are caused simultaneously to be bent to the position shown in FIGS. 1 and 2, whereupon the sheets 20 and 21 are stapled together. The next staple is automatically advanced so that it can be driven the next time the hammer is operated.

While the staple 30 is being driven into the sheets 20 and 21, the force is fairly evenly applied to the bight 31 and the tops of the legs 32 so that fracture at the nicks 33 and/or 34 does not occur. However, when it is desired to remove the staple in the manner described above, the bight 31 will break away from the legs 32.

Figure 11:
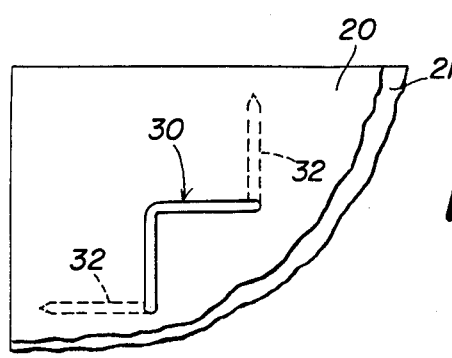
FIG. 11 depicts a modification of the applied staple, wherein the free ends of the legs diverge when applied.

In FIG. 11, the legs 32 of the staple 30, when bent into a plane parallel to the plane of the sheets 20 and 21 are respectively perpendicular to the two parts of the bight 31. The anvil for such purpose would have grooves similarly oriented. In removing the staple depicted in FIG. 11, one would hold the legs 32 down by placing two fingers of the left hand on the top paper 20 and rotate the bight 31 with the other hand.

Although the staple 30 is preferably used with a standard stapling machine, it may be used in devices that do not have an anvil. The legs would not be bent during the application and when application is complete they would remain at right angles to the plane of the bight 31.

What has been described, therefore, is an improved staple that is readily removable without the use of a tool.

I claim:

1. A system for fastening together a plurality of sheets having a frangible staple and a stapling machine comprising:

a stable having a non-linear bight lying in a first plane, two substantially parallel spaced-apart legs depending from the ends of said bright, said legs being disposed in a second plane which is substantially perpendicular to said first plane;

a pair of material weakening nicks disposed in said bight adjacent said legs, such that said bight is easily grasped, broken and separated from said legs by rotation; and a stapling machine having an anvil with a pair of spaced-apart grooves, said grooves extending obliquely in a plane which is substantially perpendicular to said legs when said legs are disposed in said stapling machine.

2. The system of claim 1 wherein the spaced-apart grooves converge.

3. The system of claim 1 wherein the spaced-apart grooves are disposed at right angles.

* * * * *